United States Patent [19]

Fukai et al.

[11] Patent Number: 4,651,286
[45] Date of Patent: Mar. 17, 1987

[54] ELECTROMAGNETIC FLOWMETER

[75] Inventors: Yoshio Fukai; Shigeru Goto, both of Tokyo, Japan

[73] Assignee: Yokogawa Hokushin Electric Corporation, Tokyo, Japan

[21] Appl. No.: 621,509

[22] Filed: Jun. 18, 1984

[30] Foreign Application Priority Data

Jun. 23, 1983 [JP] Japan .................................. 58-113278

[51] Int. Cl.$^4$ ........................... G01F 1/58; G01F 1/60; G06F 15/20
[52] U.S. Cl. ................................. 364/510; 73/861.17; 364/571
[58] Field of Search ............................... 364/510, 571; 73/861.17, 861.12, 861.16

[56] References Cited

U.S. PATENT DOCUMENTS

| 4,089,219 | 5/1978 | Suzuki | 364/510 |
| 4,156,363 | 5/1979 | Suzuki et al. | 73/861.16 |
| 4,169,375 | 10/1979 | Suzuki | 73/861.16 |
| 4,193,298 | 3/1980 | Kayama et al. | 73/861.16 |
| 4,206,640 | 1/1980 | Suzuki | 73/861.16 |
| 4,218,915 | 8/1980 | Torimaru | 73/861.16 |
| 4,227,408 | 10/1980 | Shmoock et al. | 73/861.17 |
| 4,253,156 | 2/1981 | Lisle et al. | 364/571 |
| 4,303,980 | 12/1981 | Yard | 364/510 |
| 4,325,261 | 4/1982 | Freund, Jr. et al. | 73/861.12 |
| 4,373,400 | 4/1983 | Sekiguchi | 73/861.12 |
| 4,408,497 | 10/1983 | Suzuki | 364/510 |
| 4,479,190 | 10/1984 | Takai et al. | 364/571 |
| 4,538,468 | 9/1985 | Tomita | 73/861.17 |

FOREIGN PATENT DOCUMENTS

120118  7/1983  Japan .................................. 73/861.17

Primary Examiner—Felix D. Gruber
Assistant Examiner—Danielle Laibowitz
Attorney, Agent, or Firm—Moonray Kojima

[57] ABSTRACT

An electromagnetic flow meter comprising an electromagnetic flow signal generator having a pipe through which a fluid to be measured flows, an exciting coil and a pair of electrodes, an exciting circuit for supplying an exciting current whose normal value is switched at a low frequency to the exciting coil of the generator, and a signal processing circuit for effecting an arithmetic operation and outputting a flow rate signal concerning the flow rate of the fluid based on voltages induced between the electrodes of the generator; wherein to keep constant the exciting current, the exciting circuit comprises a switching regulator for stabilizing a power supply voltage and producing an exciting DC voltage dependent on a voltage setting, a switching circuit connected between the exciting coil and the switching regulator and applying the exciting voltage, while turning ON and OFF at a low frequency, to the exciting coil and an exciting current detection means connected in series between the switching regulator and the exciting coil for detecting the exciting current flowing through the exciting coil, and the signal processor comprises means for taking a signal corresponding to the exciting current from the exciting current detection means, effecting an arithmetic operation relative to a predetermined reference value for determining the level of the normal value of the exciting current and supplying a voltage setting based on the result of the arithmetic operation to the switching regulator. Power consumption is thus lowered, efficiency is increased, and reduction in size of the circuit is achieved.

8 Claims, 7 Drawing Figures

ELECTROMAGNETIC FLOWMETER

BACKGROUND OF THE INVENTION

1. Field of Invention

This invention relates to an improved electromagnetic flowmeter which is excited at a low frequency.

2. Description of Prior Art

Known electromagnetic flowmeters are generally operated by applying a magnetic field to a fluid in a direction normal to the flow thereof, simultaneously detecting a variation in an electric signal produced by the fluid, and measuring the rate of flow of the fluid, based on the detected signal. Recent electromagnetic flowmeters, which are widely used, are excited at a low frequency with trapezoidal or square waves, and have a more stable zero point than electromagnetic flowmeters which are excited with alternating current or direct current. With the low frequency excited electromagnetic flowmeter, a current, which is supplied to an exciting coil, is periodically switched between two or three normal values, and a voltage which is induced between electrodes when the exciting current becomes constant, is sampled and computed to remove adverse influences due to an electrochemically induced d.c. voltage and an offset voltage generated by the circuit. In this manner, there is produced a signal representative of the flow rate of the fluid.

Since any variation in the exciting current results in an error, the low frequency excited electromagnetic flowmeter generally uses a constant current exciting circuit. In the constant current circuit, the exciting current is controlled, so as to be constant, by a transistor so that the voltage obtained by detecting the exciting current will be equalized to a voltage setting. The transistor used for producing a constant current suffers a large power loss and fails to make the circuit smaller in size and higher in efficiency. That has been a serious deterent in providing an energy saving electromagnetic flowmeter.

SUMMARY OF THE INVENTION

Accordingly, an object of the invention is to overcome the aforementioned and other deficiencies and disadvantages of the prior art, and to improve the prior art.

Another object is to provide an energy saving electromagnetic flowmeter which is excited at a low frequency.

A further object is to provide a low frequency excited electromagnetic flowmeter having an exciting circuit which is capable of producing an exciting current that rises and falls with good response.

A still further object is to provide a low frequency excited electromagnetic flowmeter having an exciting circuit which is capable of producing an exciting current having good flatness.

The foregoing and other objects and advantages are attained by the invention which encompasses an electromagnetic flowmeter comprising an electromagnetic flow signal generator including electrodes disposed across a fluid flow and an exciting coil positioned closely to the fluid flow; an exciting circuit having a switching regulator for stabilizing a power supply voltage and producing a d.c. voltage dependent on a voltage setting, the exciting circuit being arranged to supply the exciting coil of the electromagnetic flow signal generator with an exciting current having a normal value of zero in a quiescent period and a positive or negative normal value in an exciting period, with the quiescent period and exciting period being periodically switchable; and a signal processing circuit having a microcomputer programmed with logic for sampling signal voltages related to voltages induced between the electrodes in the quiescent and exciting periods of the exciting current, logic for sampling a voltage produced by detecting the exciting current flowing in the exciting period, logic for reading the sampled voltages as digital signals, logic for effecting an arithmetic operation on the digital signals to compute a flow rate signal, and logic for controlling the voltage setting for the switching regulator.

DESCRIPTION OF PREFERRED EMBODIMENT

Figure 1:
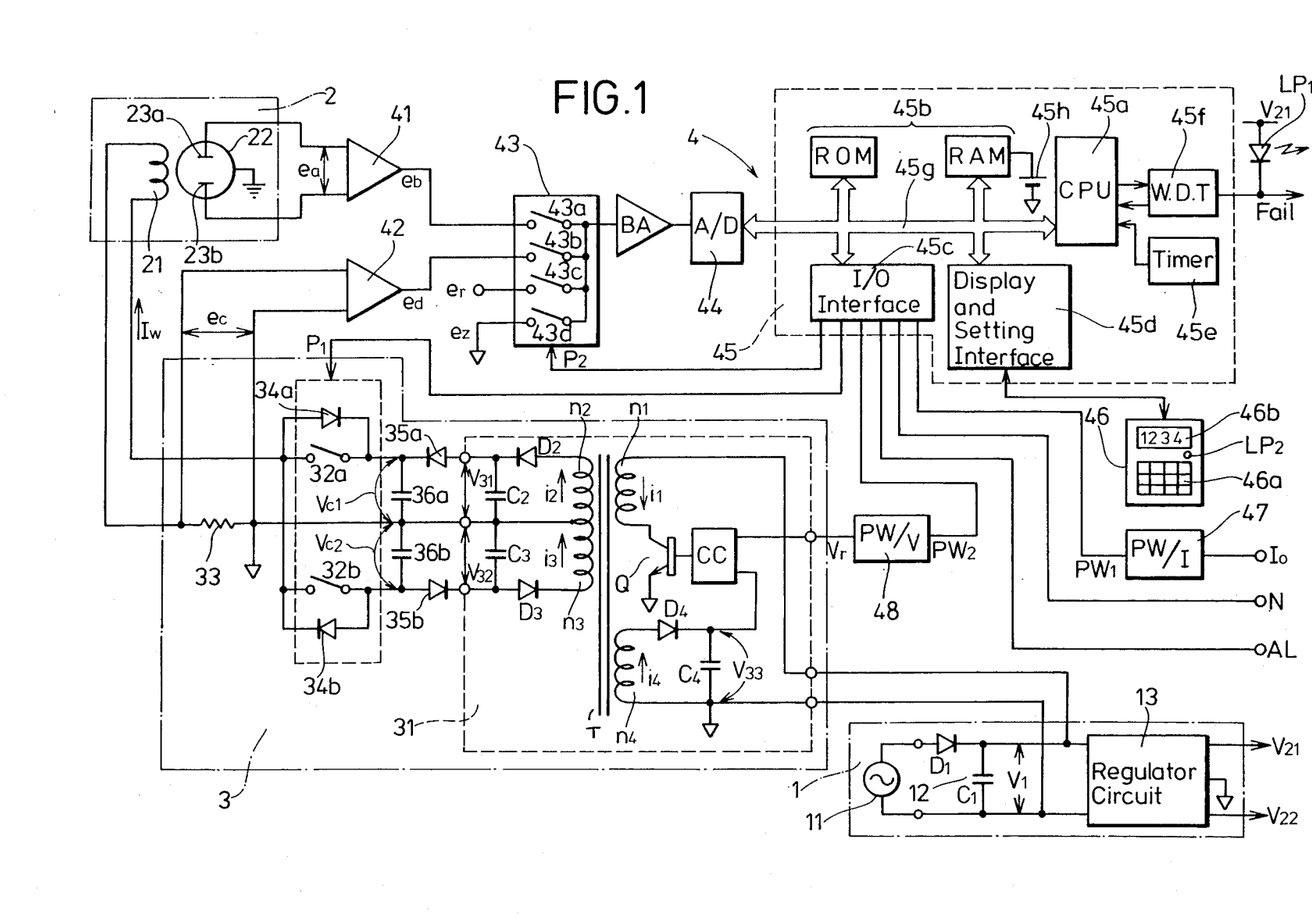
FIG. 1 is a circuit diagram, partly in block form, depicting an illustrative embodiment of the invention.

FIG. 1 depicts an electromagnetic flowmeter comprising a power supply circuit 1, an electromagnetic flow signal generator 2, an exciting circuit 3, and a signal processing circuit 4.

Power supply circuit 1 comprises a power supply 11 of 100 volts AC or 24 volts DC; a circuit 12 for rectifying and smoothing an output from power supply 11; and a regulator circuit 13, such as a switching regulator, for stabilizing an output from rectifying and smoothing circuit 12. Output $V_1$ from rectifying and smoothing circuit 12 is applied to exciting circuit 3. Positive and negative outputs $V_{21}$, $V_{22}$ from regulator circuit 13 are applied to signal processing circuit 4.

Electromagnetic flow signal generator 2 comprises an exciting coil 21; a pipe 22 through which a fluid F flows; and electrodes 23a, 23b attached to pipe 22. A voltage $e_a$ induced between electrodes 23a, 23b is related to flow speed v of fluid F and an exciting current Iw flowing through exciting coil 21.

Exciting circuit 3 comprises a switching regulator 31 for regulating output voltage $V_1$ from power supply circuit 1 and for generating constant positive and negative DC voltages $V_{31}$ and $V_{32}$ determined by a voltage setting Vr; a capacitor 36a of small capacitance to which positive DC voltage $V_{31}$ is applied via a reverse current blocking diode 35a; a capacitor 36b of small capacitance to which negative DC voltage $V_{32}$ is applied via a reverse current blocking diode 35b; switches 32a, 32b for connecting and disconnecting voltages Vc1, Vc2, respectively, across capacitors 36a, 36b to supply exciting coil 21 with exciting current Iw which cycles successively through zero, a positive value, zero and a negative value; and a current detector resistor 33 for detecting exciting current Iw.

Switching regulator 31 comprises a transformer T having a primary winding $n_1$ through which voltage $V_1$ (from power supply circuit 1) is applied to a switching transistor Q. When transistor Q is turned ON, a primary current $i_1$ flows through primary winding $n_1$. When transistor Q is turned OFF, energy, which is stored in transformer T, is discharged as secondary current $i_2$, $i_3$, $i_4$, through secondary windings $n_2$, $n_3$, $n_4$ of transformer T. Secondary current $i_2$ flowing through secondary winding $n_2$ is rectified and smoothed by a diode $D_2$ and a smoothing capacitor $C_2$ into a positive DC voltage $V_{31}$. Secondary current $i_3$ flowing through secondary winding $n_3$ is rectified and smoothed by a diode $D_3$ and a smoothing capacitor $C_3$ into a positive DC voltage $V_{32}$. Secondary current $i_4$ flowing through secondary winding $n_4$ is rectified and smoothed by a diode $D_4$ and a smoothing capacitor $C_4$ into a feedback voltage $V_{33}$ (which is related to DC voltages $V_{31}$, $V_{32}$) Voltage $V_{33}$ is applied to one terminal of a control circuit CC.

Control circuit CC compares feedback voltage $V_{33}$ with voltage setting Vr which is applied to the other terminal thereof, and turns OFF or ON transistor Q dependent on the results of the comparison. Thus, switching regulator 31 repeatedly turns ON and OFF transistor Q until $V_{33}$ is equal to Vr so that the positive and negative voltages $V_{31}$, $V_{32}$ will be kept constant. The voltage setting Vr for switching regulator 31 is given by signal processing circuit 4. Diodes 34a, 34b connected across switches 32a, 32b, respectively, serve to enable capacitors 36a,36b to absorb the energy stored in exciting coil 21 when switches 32a,32b are turned OFF. Switches 32a, 32b should preferably comprise electronic switches, such as, for example, transistors.

Figure 2:
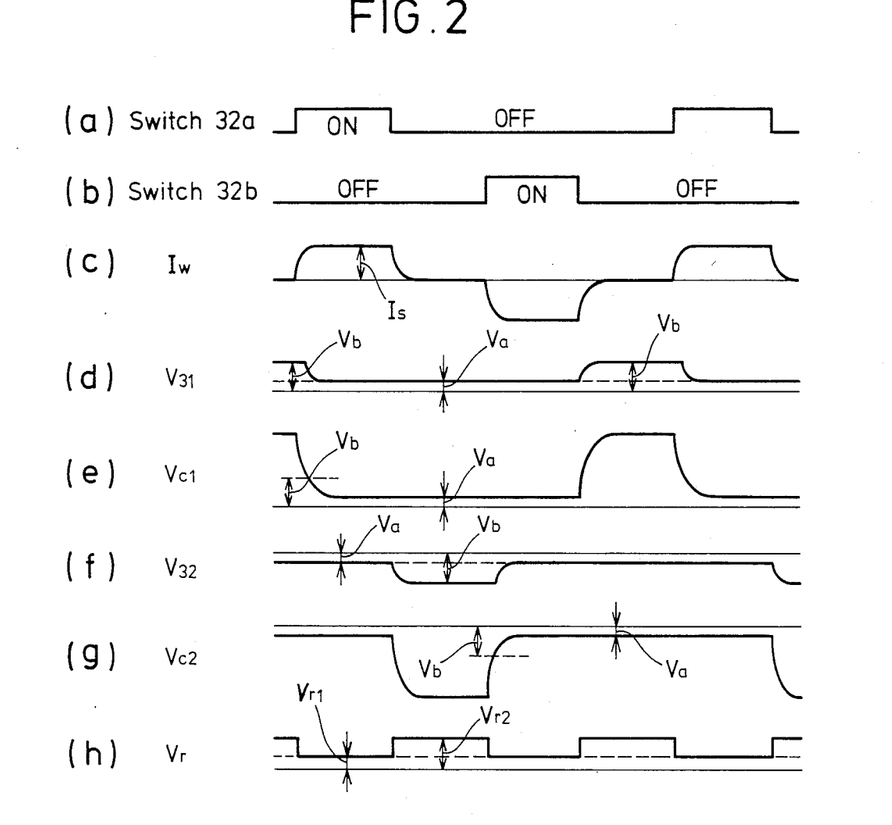
FIGS. 2, comprising lines (a) through (h), and 3 are waveform diagrams illustrating operation of the exciting circuit in the embodiment of FIG. 1.
Figure 3:
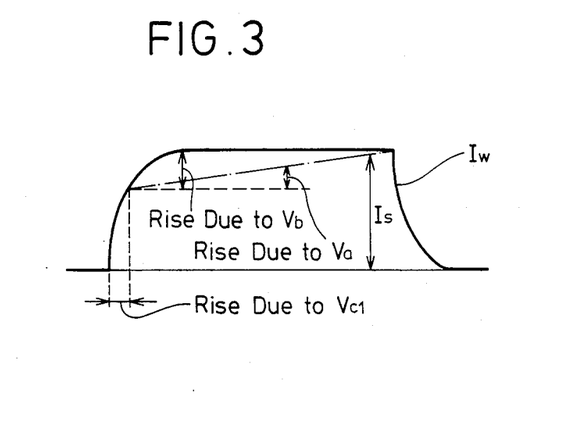

Operation of exciting circuit 3 will now be described with reference to FIGS. 2 and 3. FIG. 2 illustrates an operational pattern of switch 32a at line (a); an operational pattern of switches 32b at line (b); a waveform of exciting current Iw at line (c); a waveform of positive DC voltage $V_{31}$ at line (d); a waveform of voltage Vc1 across capacitor 36a at line (e); a waveform of negative DC voltage $V_{32}$ at line (f); a waveform of voltage Vc2 across capacitor 36b at line (g) and a waveform of voltage setting value Vr at line (h). FIG. 3 illustrates exciting current and the determinants of the wave form.

When switch 32 is closed (i.e. ON) and switch 32b is open (i.e. OFF) exciting current Iw flows in a normal direction through exciting coil 21.

When switch 32a is turned OFF, current flowing through exciting coil 21 flows through diode 34b to transfer energy stored in exciting coil 21 into capacitor 36b. The response at this time is determined by a resonant frequency dependent on the inductance of exciting coil 21 and the capacitance of capacitor 36b. Since the capacitance of capacitor 36b is small exciting current Iw flowing in the normal direction falls quickly.

When switch 32b is next turned ON, energy stored in capacitor 36b is returned to exciting coil 21 with exciting current Iw rising in a reverse direction. When voltage Vc2 across capacitor 36b reaches negative output voltage $V_{22}$ from switching regulator 31, reverse current blocking diode 35b is turned ON and exciting coil 21 is supplied with exciting current Iw in the reverse direction by negative output voltage $V_{22}$ from switching regulator 31. Exciting current Iw flowing in the reverse direction also rises quickly dependent on the inductance of exciting coil 21 and the capacitance of capacitor 36b.

When switch 32b is turned OFF, with reverse exciting current Iw being supplied to exciting coil 21, current flowing through exciting coil 21 passes through diode 34a, to transfer energy stored in exciting coil 21 to capacitor 36a, which is of small capacitance. The response at this time is determined by the inductance of exciting coil 21 and the capacitance of capacitor 36a, and exciting current Iw being in the reverse direction falls quickly.

When switch 32a is turned ON, next, energy stored in capacitor 36a is returned to exciting coil 21 with exciting current Iw rising in a normal direction. When voltage Vc1 across capacitor 36a reaches positive output voltage $V_{31}$ from switching regulator 31, reverse current blocking diode 35a is turned ON, and exciting coil 21 is supplied with exciting current Iw in the normal direction by negative output voltage $V_{31}$ from switching regulator 31. The response at this time is determined by the inductance of exciting coil 21 and exciting current Iw in the normal direction, and exciting current Iw in the normal direction rises quickly. With capacitors 36a,36b, of small capacitances, connected between the output terminals of switching regulator 31 and switches 32a,32b for switching the exciting current, low frequency exciting current Iw, which flows through exciting coil 21 and changes its polarity periodically, is caused to rise and fall quickly. The capacitances of smoothing capacitors $C_2$, $C_3$ in switching regulator 31 remain large to reduce power supply ripples sufficiently.

The actual extent of rise of exciting current Iw due to capacitors 36a,36b falls short of a current value Is, determined by a value Va of $V_{31}$,$V_{32}$ because of a loss caused by the resistance of exciting coil 21. Hence, when voltage Vc1 (or Vc2) across capacitor 36a (or 36b) is equalized to output voltage $V_{31}$ (or $V_{32}$) of switching regulator 31, as indicated by the dot and dash line in FIG. 3, exciting current Iw increases slowly at a time constant of exciting coil 21 up to current value Is, determined by $V_{31}$, $V_{32}$. Accordingly, where voltage setting Vr in switching regulator 31 is fixed at a constant value (for example, Vf1) and output voltages $V_{31}$, $V_{32}$ are rendered constant, the flatness of the exciting current Iw under normal conditions becomes poor.

To cope with this, voltage setting Vr in switching regulator 31 is switched between Vr2 during a quiescent period when switches 32a,32b are turned OFF and Vr1 during an exciting period when either one of the switches 32a,32b is turned ON (Vr2>Vr1), as shown in FIG. 2 at line (h), so that the value Vb of the positive and negative output voltages $V_{31}$, $V_{32}$ of the switching regulator 31 in the quiescent period is greater than the value Va in the exciting period.

The value Vb is retained until switch 32a or 32b is turned ON and voltage Vc1 across capacitor 36a or voltage Vc2 across capacitor 36b, reaches Vb. More specifically, when switch 32a (or 32b) is turned ON, energy stored in capacitor 36a (or 36b) is returned to exciting coil 21, and when the voltage Vc1 (or Vc2) across the capacitor 36a (or 36b) reaches value Vb of output voltage $V_{31}$ (or $V_{32}$) of switching regulator 31, reverse current blocking diode 35a (or 35b) conducts, so that exciting current Iw is increased at the resonant frequency determined by the inductance of exciting coil 21 and the capacitance of capacitor 36a (or 36b), as indicated by the solid line in FIG. 3.

When the value of output voltage $V_{31}$ (or $V_{32}$) of switching regulator 31 changes from Vb to Va, exciting current Iw reaches constant value Is. Since output voltages $V_{31}, V_{32}$ of switching regulator 31, at the time when exciting current Iw rises, are selected to be of a large value, therefore, any influence due to the loss resulting from resistance of exciting coil 21 can be compensated for to make exciting current Iw substantially flat during normal condition.

While the timing to change the voltage setting Vr for switching regulator 31 from Vr2 to Vr1 coincides with the timing to switch exciting current Iw, voltage setting Vr may continue for a short period of time after switch 32a or 32b has been turned ON. Since exciting circuit 3 comprises switching regulator 31 which suffers a small power loss and can easily be rendered smaller in size and higher in efficiency, and since the normal value of exciting current Iw can be kept constant, the exciting circuit of the invention consumes a much smaller amount of electric power than would exciting circuits using conventional constant current circuits.

Returning to FIG. 1, signal processing circuit 4 comprises an input amplifier 41 for amplifying voltage $e_a$ induced between electrodes 23a,23b in electromagnetic flow signal generator 2; an amplifier 42 for amplifying a detected voltage $e_c$ from current detecting resistor 33; an input switching circuit 43 for switching between an output $e_b$ from input amplifier 41, an output $e_d$ from amplifier 42, a reference voltage $e_r$, and a zero voltage $e_z$; an A/D converter 44 for converting a voltage selected by input switching circuit 43 and applied via a buffer BA into a digital signal; a microcomputer 45 for receiving digital signals from A/D converter 44 and effecting digital arithmetic operation on the received digital signal; a display and setting unit 46 for displaying the results of the arithmetic operation by microcomputer 45 and for setting parameters; a pulse width to current converter 47 for converting a pulse width signal $PW_1$ from microcomputer 45, into an output current $I_o$; and a pulse width to voltage converter 48 for converting a pulse width signal $PW_2$ from microcomputer 45 into voltage setting Vr.

Microcomputer 45 comprises a microprocessor (hereinafter called "CPU"); a memory unit 45b having a ROM (read only memory) and a RAM (random access memory); an input/output interface 45c; a display and setting interface 45d; a timer 45e; a watchdog timer 45f; a battery 45h; and a data bus 45g. The computer unit can be programmed with logic that will carry out the steps required to operate the apparatus.

The CPU is controlled by a program stored in ROM in memory unit 45b for controlling input switching circuit 43, A/D converter 44, switches 32a,32b in the exciting circuit 3, and for effecting digital arithmetic operation and self-diagnosis when desired. The RAM in memory unit 45b serves to store data temporarily and is backed up by battery 45h. The RAM has certain dedicated registers, such as an input register and an output register. Input/output interface 45c serves to transmit signals between CPU 45a and the peripheral circuits.

Timer 45e supervises the scanning period of the arithmetic operation (for example, 160 ms when commercial power supply frequency is 50 Hz) and has a reference clock generator comprising a crystal resonator. Timer 45e, for example, issues a timer interrupt signal to CPU 45a at every 5 ms. Watchdog timer 45f operates when CPU 45a does not function properly due to a malfunction or a program error. When any malfunction is detected, watchdog timer 45f generates a fail signal "FAIL" and indicates the failure condition through a fail lamp $LP_1$. Display and setting interface 45d reads an input from a key switch board 46a and energizes a display section 46b.

Figure 4:
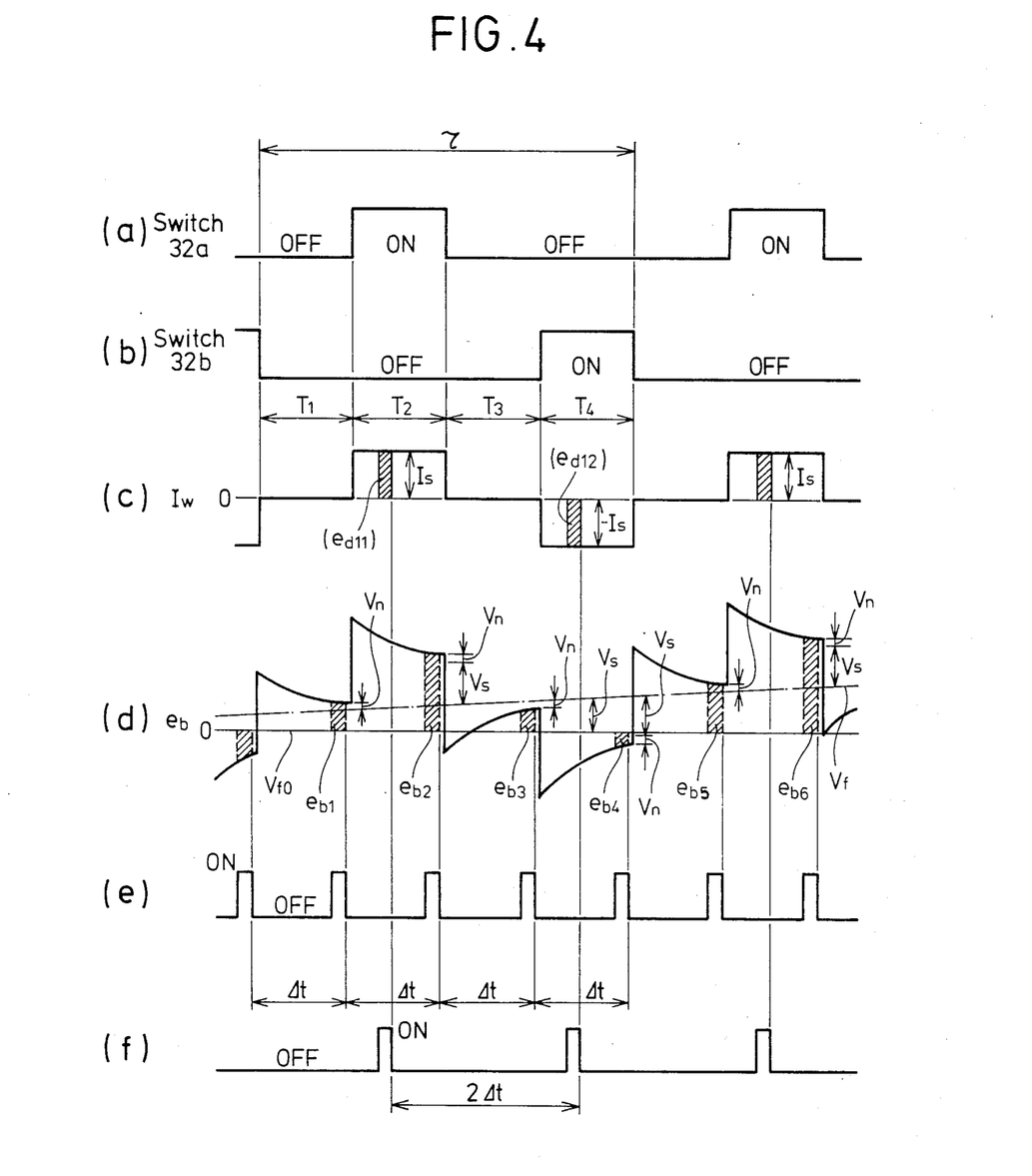
FIG. 4, comprising lines (a) through (f), are a waveform diagrams illustrating the operation of the embodiment of FIG. 1.

Operation of the described electromagnetic flowmeter will now be described with reference to FIGS. 4, 5 and 6. Switches 32a,32b in exciting circuit 3 are turned ON and OFF, as shown in FIG. 4 at line (a) and line (b), by a drive pulse $P_1$ (see FIG. 1) from microcomputer 45.

During time period $T_2$, in which switch 32a is turned ON and switch 32b is turned OFF, exciting current Iw (see line (c)) flows in the normal direction (in the direction of arrow in FIG. 1) through the exciting coil 21. During time period $T_4$, in which switch 32a is turned OFF and switch 32b is turned ON, exciting current Iw flows in the reverse direction (in the direction opposite to the arrow in FIG. 1) through exciting coil 21. Time periods $T_1$ and $T_3$ are quiescent periods, and time periods $T_2$ and $T_4$ are exciting periods.

During periods $T_1$, $T_3$ during which both switches 32a and 32b are turned OFF, no current flows through exciting coil 21. Hence, exciting coil 21 is supplied with exciting current Iw having its normal value at zero in quiescent time periods $T_1$ and $T_3$. The exciting current is positive in the exciting periods $T_2$ and $T_4$, as shown in FIG. 4 at line (c). Each of the periods $T_1$, $T_2$, $T_3$ and $T_4$, is selected to be a multiple by an integer of the period of a commercial power supply, such as, for example 40 ms.

Although not shown, exciting current Iw actually reaches its normal value with a delay at rising and falling waveforms due to the influence of exciting coil 21 when exciting current Iw is switched by switches 32a,32b.

Voltage $e_a$ is induced between electrodes 23a,23b in electromagnetic flow signal generator 2, dependent on exciting current Iw. Induced voltage $e_a$ is amplified by input amplifier 41 in signal processing circuit 4 into signal voltage $e_b$ as shown in FIG. 4, at line (d). Signal voltage $e_b$ contains a signal component Vs which is proportional to the flow speed v of fluid flowing through pipe 22 and exciting current Iw, a noise component Vn due to the switching of exciting current Iw, and an offset voltage component Vf due to an electrochemically induced DC voltage and also due to the circuit.

Noise component Vn contains an electromagnetic coupling noise produced in the loop between electrodes and electrode leads at the time the exciting current is switched, and an eddy current noise produced by and eddy current flowing in the fluid and a circuit having a time lag of first order and formed by a fluid resistance R and an interface electric double layer capacitance C of the electrodes.

Voltages $e_{b1}$, $e_{b2}$, $e_{b3}$, $e_{b4}$, $e_{b5}$ obtained by sampling signal voltages $e_b$ at fixed time intervals $\Delta_t$ as indicated by the shaded portions in FIG. 4 at line (d) are given by the following equations, wherein the offset voltage component Vf can be regarded as varying at a constant ratio of change in a short time, such as 200 ms, and hence, is subjected to the Tailor expansion and approximated by a linear expression.

$$e_{b1} = Vn + Vf0 \qquad (1)$$

$$e_{b2} = Vs + Vn + Vf0 + Vf1$$

$$e_{b3} = -Vn + Vf0 + 2Vf1$$

$$e_{b4} = -Vs - Vn + Vf0 + 3Vf1$$

-continued $$e_{b5} = Vn + Vf0 + 4Vf1$$

Figure 5:
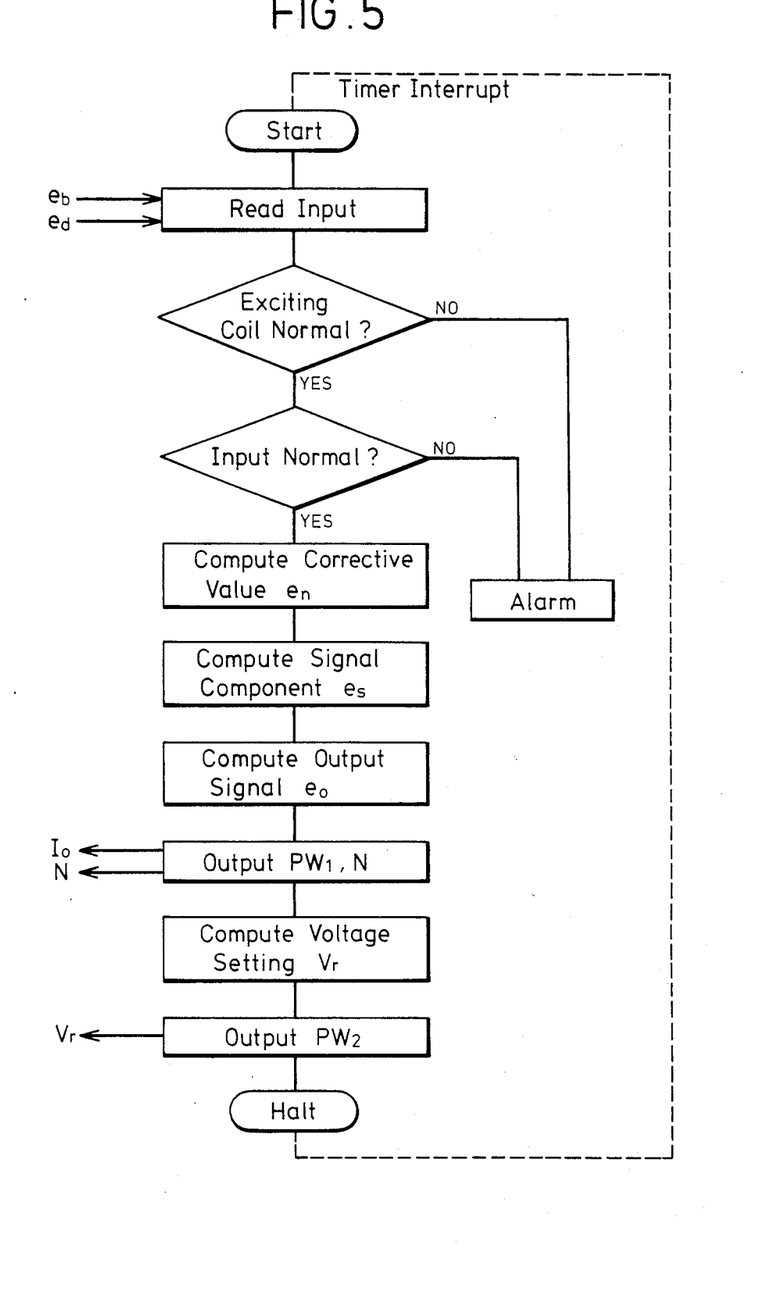
FIG. 5 is a flow chart depicting progressive steps of operation of the embodiment in a measurement mode.

As shown in the flow chart of FIG. 5, after "START", microcomputer 45 reads at step "READ INPUT", voltages $e_b$ and $e_d$. The reading is done successively through A/D converter 44, of a voltage produced by driving switch 43a in input switching circuit 43 at the constant interval $\Delta_t$ with drive pulses $P_2$ and sampling signal voltage $e_b$ in the quiescent and exciting time periods, as shown in FIG. 4, at line (e), and a voltage produced by driving switch 43b in input switching circuit 43 at constant time intervals $2\Delta_t$ and sampling a detected voltage $e_d$ generated by the exciting current Iw in the exciting time period.

As a result, the register in RAM in memory unit 45b in microcomputer 45 stores as digital signals the sampled values $e_{b1}$, $e_{b2}$, $e_{b3}$, $e_{b4}$ of signal voltage $e_b$ and sampled values $e_{d1}$, $e_{d2}$ of voltage $e_d$ produced by the detected current. After these input signals have been read, microcomputer 45 determines whether "Exciting Coil Normal", and whether "Input Normal", that is whether signal $e_b$ and detected voltage $e_d$ fall within respective allowable ranges.

If voltage $e_d$ exceeds the allowable range, then, microcomputer 45 decides that exciting coil 21 is open or short circuited (i.e. "Exciting Coil Normal" step is NO) and generates an alarm signal A1 and simultangeously energizes an alarm lamp $LP_2$ in display and setting unit 46.

If voltage $e_b$ exceeds its allowable range while voltage $e_d$ is in its allowable range (i.e. "Exciting Coil Normal" step is YES), then microcomputer 45 decides that the input is not normal (i.e. "Input Normal" step is NO), and generates alarm signal A1 and lights alarm lamp $LP_2$.

If voltages $e_b$ and $e_d$ are both in the allowable ranges (i.e. both "Exciting Coil Normal" step and "Input Normal" step are YES), then microcomputer 45 effects the following arithmetic operations. First, at step "Compute Corrective Value $e_n$", a corrective value is obtained. Then, signal Es is computed by equation (2) below, by operating on digital signals corresponding to the sampled values $e_{b1}$, $e_{b2}$, $e_{b3}$, $e_{b4}$ of signal voltage $e_b$ stored in the RAM and generated in quiescent periods $T_1$, $T_3$ and in exciting periods $T_2$, $T_4$.

This effectively removes offset voltage component Vf and noise component Vn due to the switching of the exciting current to produce an output $e_s$ related only to the signal component Vs. The result of the arithmetic operation is stored in the RAM.

The output $e_s$ is as follows:

$$e_s = \tfrac{1}{2}(-e_{b1} + e_{b2} + e_{b3} - e_{b4}) = Vs \qquad (2)$$

Since signal component Vs is related to exciting current Iw, microcomputer 45 removes adverse influences due to variation in the exciting current by effecting a digital arithmetic operation, expressed by below equation (3), on digital signals corresponding to sampled values $e_{d1}$, $e_{d2}$ of voltage $e_d$ and stored in the RAM, and output $e_s$ as the result of the arithmetic operation. In the flowchart, the operation is described as "Compute Output Signal $e_o$" step.

$$e_o = \frac{2e_s}{e_{d1} - e_{d2}} \qquad (3)$$

The result indicative of $e_o$ is then stored in RAM, and is converted by microcomputer 45 into a pulse width signal $PW_1$ which is applied through input/output interface 45c to pulse width to current converter 47, having an insulating means, such as a photocoupler, at a front stage thereof, from which an analog output current Io is generated (at step "Output $PW_1$, N"). The result indicating $e_o$ is also converted into a number of pulses N which are transmitted via input/output interface 45c. The result is also indicated on data display 45b in display and setting unit 46.

The microcomputer 45 performs at step "Compute Voltage Setting Vr", a PI operation (abbreviation for proportional and integral operation) on a deviation between the difference between the sampled values $e_{d1'}$, $e_{d2}$ of voltage $e_d$ and a reference value $\alpha$ preset by display and setting unit 46. Then, microcomputer 45 effects an arithmetic operation $\alpha(1=\beta)$ on a PI output $\beta$ and reference value $\alpha$ to compute a digital value corresponding to value Vr1 of voltage setting Vr in the exciting period of switching regulator 31, and stores the computed digital value in RAM.

Then, microcomputer 45 adds a previously calibrated value to the computed digital value, to compute a digital value corresponding to value Vr2 of voltage setting Vr in the quiescent period of switching regulator 31, and stores the computed digital value in the RAM. The digital values corresponding to Vr1, Vr2 and stored in the RAM are alternately supplied as the pulse width signal $PW_2$ from microcomputer 45, at step "Output $PW_2$".

The voltage Vr1 is applied as a voltage setting to switching regulator 31 in the exciting period through pulse width to voltage converter 48, having an insulating means, such as a photocoupler, at a front stage thereof. Voltage Vr2 is applied as a voltage setting to the switching regulator 31 in the quiescent period through the pulse width to voltage converter 48. As a consequence, the value Vb of the positive and negative voltages $V_{31}$, $V_{32}$ of switching regulator 31 in the quiescent period becomes greater than the value Va thereof, in the exciting period.

Therefore, the value of output voltages $V_{31}$, $V_{32}$ at the time the exciting current Iw rises is increased to compensate for the influence due to the loss, because of the resistance of the exciting coil 21, for example, to improve the flatness of the exciting current Iw under normal conditions. The operation is then ended at "Halt" step, and may be repeated at "Start".

Figure 6:
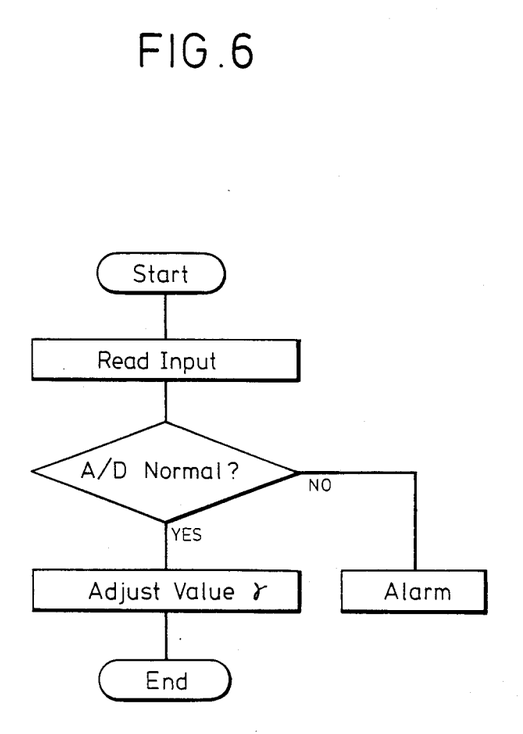
FIG. 6 is a flow chart depicting progressive steps of operation of the embodiment in a calibration mode.

In a calibration mode, as shown in FIG. 6, after "Start" step, microcomputer 45 in "Read Input" step, drives input switching circuit 43 with a drive pulse $P_2$; samples at constant sampling intervals $\Delta_t$, a zero voltage $e_z$ and a signal voltage $e_{b12}$ in the quiescent period $T_1$, detected voltages $e_{d11'}$, $e_{d12}$ produced by the exciting current Iw in the exciting period $T_2$, a reference voltage $e_r$ and a signal voltage $e_{b32}$ in the quiescent period $T_3$ and detected voltages $e_{d21'}$, $e_{d22}$ produced by exciting current Iw in the exciting period $T_4$. Then, microcomputer 45 reads the sampled voltages as digital signals through A/D converter 44, and stores them in the RAM. After these inputs have been read, the computer 45 determines, in step "A/D Normal" whether the zero voltage $e_z$ and reference voltage $e_r$ fall in respective preset allowable ranges. If they exceed the ranges (i.e. NO), then microcomputer 45 decides that the A/D converter 44 is not normal, and generates an alarm signal AL and energizes alarm lamp $LP_2$ in display and setting unit 46.

If A/D converter 44 is normal (i.e. YES) then microcomputer 45 in step "Adjust Value $\gamma$" adjusts value $\gamma$ corresponding to the difference in the voltage setting Vr2 in the quiescent period and in the voltage setting Vr1 in the exciting period, so that the difference between sampled values $e_{d11'}$, $e_{d21}$ of the detected voltage $e_d$ which are stored in the RAM is equalized to the difference between the sampled values $e_{d12'}$, $e_{d22}$ stored in the RAM, thereby checking the flatness of the normal value Is of the exciting current Iw. The sequence is then at "End".

Microcomputer 45 is programmed so that one calibration mode is carried out normally after the measurement mode has repeatedly been effected ten times. Also, at the time the power supply is switched ON, one calibration mode is effected after the measurement mode has been repeated three times.

While in the above description, the signal component Vs is computed according to equation (2), it may be computed according to equation (4). Equation (4) is effective, provided signal component Vs can practically be computed using the sampled values of signal voltage in the quiescent period and in the exciting period.

$$e_s = \tfrac{1}{4}(-e_{b2} + 3e_{b3} - 3e_{b4} + e_{b5}) = Vs \quad (4)$$

Figure 7:
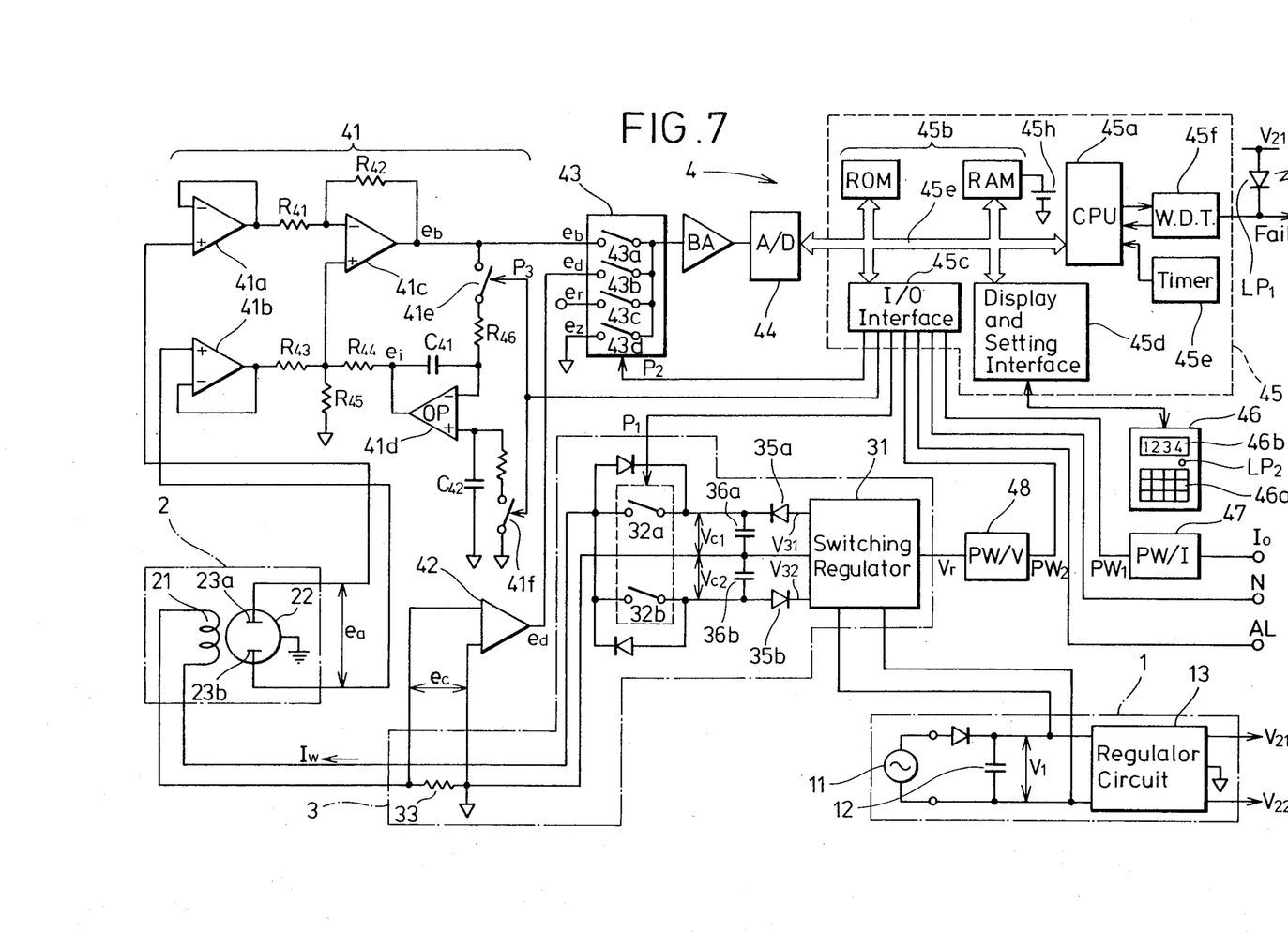
FIG. 7 is a circuit diagram, partly in block form, of another illustrative embodiment.

Input amplifier 41 in signal processing circuit 4 has a first stage ordinarily comprising a DC coupled buffer amplifier. Where the first stage of input amplifier 41 comprises a directly coupled buffer amplifier, to extend the frequency range into lower frequencies, a large offset voltage is generated in a following differential amplifier when the electrodes in the electromagnetic flow signal generator 2 have unbalanced impedances. Such an offset voltage can be compensated for by connecting an integrating circuit 41d and sampling switches 41e, 41f, as shown in FIG. 7, between the output terminals of a differential amplifier 41c and an input terminal (+) thereof. The sampling switches 41e,41f are controlled by pulses $P_3$ from the microcomputer 45 so that they are turned ON in the quiescent period $T_3$ in the calibration mode, to charge voltage in integrating circuit 41d to compensate for the offset voltage in the differential amplifier 41c. When sampling switches 41e,41f are turned OFF, an output $e_i$ from integrating circuit 41d varies at a gradient determined by a bias current for an operational amplifier OP of an integrating circuit 41d.

As a result, the offset component Fv of the output $e_b$ from input amplifier 41 is the sum of an electrochemically produced DC voltage which varies linearly and a linearly varying DC voltage produced by integrating circuit 41d.

Therefore, the offset voltage generated in integrating circuit 41d can be cancelled by producing signal component Vs through digital arithmetic operation effected by microcomputer 45 according to equation (2), thereby effectively compensating for the offset in input amplifier 41.

Turning again to FIG. 7, input amplifier 41 further comprises directly coupled buffer amplifier 41a,41b; resistors $R_{41}$, $R_{42}$, $R_{43}$, $R_{44}$, $R_{45}$, $R_{46}$, $R_{47}$; and capacitors $C_{41}$, $C_{42}$.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. An electromagnetic flowmeter comprising
   an electromagnetic flow signal generator including electrodes disposed across a fluid flow and an exciting coil positioned closely to said fluid flow;
   an exciting circuit having a switching regulator for stabilizing a power supply voltage and producing a DC voltage dependent on a voltage setting, said exciting circuit being arranged to supply said exciting coil of said electromagnetic flow signal generator with an exciting current having a normal value of zero in a quiescent period and a positive or negative normal value in an exciting period, said quiescent period and said exciting period being periodically switchable; and
   a signal processing circuit having a microcomputer programmed with
   logic for sampling signal voltages related to voltage induced between said electrodes in said quiescent and exciting periods of said exciting current,
   logic for sampling a voltage produced by detecting said exciting current flowing in said exciting period,
   logic for reading the sampled voltages as digital signals;
   logic for effecting an arithmetic operation on said digital signals to compute a flow rate signal, and
   logic for controlling said voltage setting for said switching regulator;
   wherein said voltage setting for said switching regulator is switched to a larger value in said quiescent period of said exciting current than in said exciting period.

2. An electromagnetic flowmeter comprising
   an electromagnetic flow signal generator including electrodes disposed across a fluid flow and an exciting coil positioned closely to said fluid flow;
   an exciting circuit having a switching regulator for stabilizing a power supply voltage and producing a DC voltage dependent on a voltage setting, said exciting circuit being arranged to supply said exciting coil of said electromagnetic flow signal generator with an exciting circuit having a normal value of zero in a quiescent period and a positive or negative normal value in an exciting period, said quiescent period and said exciting period being periodically switchable; and
   a signal processing circuit having a microcomputer programmed with
   logic for sampling signal voltages related to voltages induced between said electrodes in said quiescent and exciting periods of said exciting current,
   logic for sampling a voltage produced by detecting said exciting current flowing in said exciting period,
   logic for reading the sampled voltages as digital signals,
   logic for effecting an arithmetic operation on said digital signals to compute a flow rate signal, and logic for controlling said voltage setting for said switching regulator;

wherein said switching regulator has a first output terminal to which a positive DC voltage is applied and a second output terminal to which a negative DC voltage is applied; and wherein said exciting circuit further comprises a first capacitor of small capacitance connected through a first reverse current blocking diode to said first output terminal, a second capacitor of small capacitance connected through a second reverse current blocking diode to said second output terminal, means connecting a series connected circuit comprising a first switch and said exciting coil parallel to said first capacitor, means connecting a series connected circuit comprising a second switch and said exciting coil parallel to said second capacitor, and diodes connected parallel, respectively, to said first and second switches, for allowing currents to flow in directions opposite to the directions in which the exciting current flows through said first and second switches.

3. An electromagnetic flow meter comprising an electromagnetic flow signal generator having a pipe through which a flow to be measured flows, an exciting coil and a pair of electrodes, an exciting circuit for supplying an exciting current whose normal value is switched at a low frequency to the exciting coil of the electromagnetic flow signal generator and a signal processing circuit for effecting an arithmetic operation and outputting a flow rate signal related to the flow rate of the fluid to be measured based on voltages induced between the electrodes of the electromagnetic flow signal generator, wherein said exciting circuit comprises a switching regulator for stabilizing the power supply voltage and producing an exciting DC voltage corresponding to the voltage setting;

a switching circuit connected between said exciting coil and said switching regulator for supplying said exciting voltage while turning ON and OFF at a low frequency to said exciting coil; and an exciting current detection means connected in series between said switching regulator and said exciting coil for detecting the exciting current flowing through said exciting coil; and wherein said signal processing circuit comprises means for taking a signal corresponding to the exciting current from said exciting current detection means, effecting an arithmetic operation relative to a predetermined reference value for determining the level of the normal value of said exciting current and supplying the voltage setting based on the result of the arithmetic operation to said switching regulator;

further comprising a first capacitor of a small capacitance connected to the first output terminal for outputting the positive DC voltage of the switching regulator by way of a first reversed current blocking diode;

a second capacitor of a small capacitance connected to the second output terminal for outputting the negative DC voltage of the switching regulator by way of a second reversed current blocking diode;

a first switch of a switching circuit connected between said first capacitor and said exciting coil;

a second switch of a switching circuit connected between said second capacitor and said exciting coil; and diodes connected respectively in parallel with said first and second switches and through which currents flow in directions opposite to those of the currents flowing through said first and second switches.

4. The flow meter of claim 3, wherein the switching regulator comprises a serial circuit of a primary winding of a transformer and a switching element applied with a voltage from a power supply by way of a rectifying circuit and a smoothing capacitor;

means for rectifying and smoothing the secondary current produced in the first secondary winding of said transformer upon turning ON and OFF of said switching element and outputting a positive DC voltage;

means for rectifying and smoothing the secondary current produced in the second secondary winding of said transformer upon turning ON and OFF of said switching element and outputting a negative DC voltage;

means for rectifying and smoothing the secondary current produced in the third secondary winding of said transformer upon turning ON and OFF of said switching element and obtaining a DC feedback voltage; and means for controlling the ON and OFF of said switching element so as to equalize said feedback voltage with the voltage setting.

5. The flow meter of claim 3, wherein the signal processing circuit takes a signal corresponding to the exciting current detected by the exciting current detection means, effects an arithmetic calculation relative to a predetermined reference value for determining the level of the normal value of said exciting current, outputs the result of the arithmetic operation as a pulse width signal and supplies said pulse width signal as a voltage setting to the switch regulator after converting the signal into a voltage in a pulse width voltage conversion circuit.

6. An electromagnetic flowmeter comprising an electromagnetic signal generator having a pipe through which a fluid to be measured flows, an exciting coil and a pair of electrodes, an exciting circuit for supplying an exciting current whose normal value is switched at a low frequency to the exciting coil of the electromagnetic flow signal generator and a signal processing circuit for effecting an arithmetic operation and outputting a flow rate signal related to the flow rate of the fluid to be measured based on voltages induced between the electrodes of the electromagnetic flow signal generator, wherein said exciting circuit comprises a switching regulator for stabilizing the power supply voltage and producing an exciting DC voltage corresponding to the voltage setting;

a switching circuit connected between said exciting coil and said switching regulator for supplying said exciting voltage while turning ON and OFF at a low frequency to said exciting coil; and an exciting current detection means connected in series between said switching regulator and said exciting coil for detecting the exciting current flowing through said exciting coil; and wherein said signal processing circuit comprises means for taking a signal corresponding to the exciting current from said exciting current detection means, effecting an arithmetic operation relative to a predetermined reference value for determining the level of the normal value of said exciting current and supplying the voltage setting based on the result of the arithmetic operation to said switching regulator;

wherein the signal processing circuit takes a signal corresponding to the exciting current detected by the exciting current detection means, effects an arithmetic calculation relative to a predetermined reference value for determining the level of the normal value of said exciting current, outputs the result of the arithmetic operation as a pulse width signal and supplies said pulse width signal as a voltage setting to the switch regulator after converting the signal into a voltage in a pulse width voltage conversion circuit;

wherein the pulse width signal is supplied by way of insulation means to the pulse width voltage conversion circuit.

7. An electromagnetic flow meter comprising an electromagnetic flow signal generator having a pipe through which a fluid to be measured flows, an exciting coil and a pair of electrodes, an exciting circuit for supplying an exciting current whose normal value is switched at a low frequency to the exciting coil of the electromagnetic flow signal generator and a signal processing circuit for effecting an arithmetic operation and outputting a flow rate signal related to the flow rate of the fluid to be measured based on voltages induced between the electrodes of the the electromagnetic flow generator, wherein said exciting circuit comprises a switching regulator for stabilizing the power supply voltage and producing an exciting DC voltage corresponding to the voltage setting;

a switching circuit connected between said exciting coil and said switching regulator for supplying said exciting voltage while turning ON and OFF at a low frequency to said exciting coil; and an exciting current detection means connected in series between said switching regulator and said exciting coil for detecting the exciting current flowing through said exciting coil; and wherein said signal processing circuit comprises means for taking a signal corresponding to the exciting current from said exciting current detection means, effecting an arithmetic operation relative to a predetermined reference value for determining the level of the normal value of said exciting current and supplying the voltage setting based on the result of the arithmetic operation to said switching regulator;

wherein the signal processing circuit monitors when the taken signal corresponding to the exciting current is within an allowable range or not and outputs an alarm signal when it is out of the allowable range and judging it as an abnormality in the exciting coil.

8. An electromagnetic flow meter comprising an electromagnetic flow signal generator having a pipe through which a fluid to be measured flows, an exciting circuit for supplying an exciting current having a normal value zero in a quiescent period and a positive or negative normal value in an exciting period, said periods being switchable at a low frequency, and a signal processing circuit having a microcomputer for effecting an arithmetic operation and outputting a flow rate signal related to a flow rate of said fluid to be measured based on voltages induced across the electrodes of said electromagnetic flow signal generator; wherein said exciting circuit comprises a switching regulator for stablizing the power source voltage and outputting an exciting DC voltage depending on the voltage setting;

a switching circuit connected between said exciting coil and said switching regulator and applying said exciting voltage to said exciting coil while turning ON and OFF at a low frequency; and exciting current detection means connected in series between said switching regulator and said exciting coil for detecting the exciting current flowing through said exciting coil; and wherein said signal processing circuit comprises means for taking a signal corresponding to the exciting current from said exciting current detection means, effecting an arithmetic operation related to a predetermined reference value for determining the level of the normal value of said exciting current and alternately supplying the voltage setting in the quiescent period and the voltage setting in the excited period to said switching regulator based on the result of the arithmetic operation;

wherein the voltage setting in the quiescent period is made greater than the voltage setting in the excited period of the switching regulator.

* * * * *